US012556500B2

(12) United States Patent
Dondapati et al.

(10) Patent No.: US 12,556,500 B2
(45) Date of Patent: Feb. 17, 2026

(54) MESSAGE ENGAGEMENT ENHANCEMENT UTILIZING EYE TRACKING AND TEXT ANALYSIS (71) Applicant: INTERNATIONAL BUSINESS MACHINES CORPORATION, Armonk, NY (US)

(72) Inventors: Vamshi Dondapati, Hyderabad (IN); Shabna Madathil Thattantavida, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 18/640,084

(22) Filed: Apr. 19, 2024

(65) Prior Publication Data

US 2025/0330435 A1  Oct. 23, 2025

(51) Int. Cl.
G06F 15/16    (2006.01)
G06F 3/01     (2006.01)
G06F 40/20    (2020.01)
H04L 51/043   (2022.01)

(52) U.S. Cl.
CPC ............ *H04L 51/043* (2013.01); *G06F 3/013* (2013.01); *G06F 40/20* (2020.01)

(58) Field of Classification Search
CPC ......... H04L 51/043; G06F 3/013; G06F 40/20
See application file for complete search history.

(56) References Cited

U.S. PATENT DOCUMENTS

| 7,429,108 B2 | 9/2008 | Rosenberg |
| 10,565,448 B2 | 2/2020 | Bell |
| 11,403,881 B2 | 8/2022 | Delaney |

(Continued)

FOREIGN PATENT DOCUMENTS

WO  2020147945 A1  7/2020

OTHER PUBLICATIONS

Disclosed Anonymously, "Analyze user's specific eye behaviour along with other parameters to identify if a sent message has been read by the recipients," IP.com, Oct. 6, 2016, 4 pages, IP.com No. IPCOM000247767D, Retrieved from the Internet: <URL: https://priorart.ip.com/IPCOM/000247767>.

(Continued)

*Primary Examiner* — John B Walsh
(74) *Attorney, Agent, or Firm* — Teddi E. Maranzano (57) ABSTRACT According to one embodiment, a method, computer system, and computer program product for electronic message engagement assessment is provided. The present invention may include displaying an electronic message to be read by a recipient on a device of the recipient; ranking an importance of one or more words and phrases in the electronic message; performing gaze and pupil dilation tracking using one or more cameras and one or more sensors to produce a plurality of tracking data; calculating a word engagement index using the plurality of tracking data and contents of the electronic message; combining the word engagement index and the importance rankings to generate a message reading index; comparing the message reading index to a predetermined threshold value to determine a reading confirmation index; and determining if the recipient has sufficiently read the electronic message based on the reading confirmation index.

17 Claims, 3 Drawing Sheets

(56) References Cited

U.S. PATENT DOCUMENTS

| | | |
|---|---|---|
| 2015/0039703 A1 | 2/2015 | Kursun |
| 2016/0094705 A1 | 3/2016 | Vendrow |
| 2019/0057254 A1 | 2/2019 | Bell |
| 2020/0125671 A1* | 4/2020 | Li .................. G06F 16/335 |
| 2020/0153776 A1* | 5/2020 | Qiu .................. G06F 9/542 |
| 2020/0159986 A1* | 5/2020 | Djamasbi ............ G06F 40/40 |
| 2021/0216579 A1 | 7/2021 | Stelmar Netto |

OTHER PUBLICATIONS

Disclosed Anonymously, "Harnessing Pupil Dynamics: Leveraging Pupil Dilation and Contraction for an Automatic Content Review System," IP.com, Sep. 15, 2023, 5 pages, IP.com No. IPCOM000272950D, Retrieved from the Internet: <URL: https://priorart.ip.com/IPCOM/000272950>.

Disclosed Anonymously, "Method and System for Eye Gaze User Consumption Visualization Filtering with Comprehension Amplification," IP.com, Mar. 18, 2019, 4 pages, IP.com No. IPCOM000257862D, Retrieved from the Internet: <URL: https://priorart.ip.com/IPCOM/000257862>.

Shen, et al., "PupilRec: Leveraging Pupil Morphology for Recommending on Smartphones," IEEE Internet of Things Journal [article], Sep. 1, 2022 [accessed on Feb. 5, 2024], pp. 15538-15553, vol. 9, Issue 17, IEEE, DOI: 10.1109/JIOT.2022.3181607, Retrieved from the Internet: <URL: https://ieeexplore.ieee.org/document/9792275>.

Slanzi, et al., "Combining eye tracking, pupil dilation and EEG analysis for predicting web users click intention," Information Fusion [article], May 2017, pp. 51-57, vol. 35, DOI: 10.1016/j.inffus.2016.09.003, Retrieved from the Internet: <URL: https://www.sciencedirect.com/science/article/abs/pii/S1566253516300756>.

* cited by examiner

MESSAGE ENGAGEMENT ENHANCEMENT UTILIZING EYE TRACKING AND TEXT ANALYSIS

BACKGROUND

The present invention relates, generally, to the field of computing, and more particularly to instant messaging.

Instant messaging is a kind of communication over the Internet that offers real-time text-based communication between two or more participants. Messages are typically transmitted between parties when each user inputs text and triggers a transmission to a recipient. A read receipt feature is integrated into most modern messaging applications and indicates that a user has read a message.

SUMMARY

Embodiments of a method, a computer system, and a computer program product for electronic message engagement assessment are described. According to at least one embodiment, a method, computer system, and computer program product for message engagement assessment may include displaying an electronic message to be read by a recipient on a device of the recipient; ranking an importance of one or more words and phrases in the electronic message; performing gaze and pupil dilation tracking using one or more cameras and one or more sensors to produce a plurality of tracking data; calculating a word engagement index using the plurality of tracking data and contents of the electronic message; combining the word engagement index and the importance rankings to generate a message reading index; comparing the message reading index to a predetermined threshold value to determine a reading confirmation index; and determining if the recipient has sufficiently read the electronic message based on the reading confirmation index.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to electronic messaging systems, and in particular, assessing a message recipient's reading engagement while communicating via electronic messaging systems. The present embodiment has the capacity to improve the assessment of electronic message engagement and thus, the communication between users while utilizing electronic messaging systems. The present embodiment can dynamically trigger a determination that a message recipient has read the received message based on dynamically tracking the engagement of a recipient as they are reading a message and calculating/generating/determining several indexes based on the engagement of the recipient.

Currently, determining whether a message recipient has read the entirety of an electronic message is performed using a read receipt feature. Current methods trigger a determination that a message has been read based on measuring a recipient's eyes traveling from the first line of a message to the last line of the message as they read the message. However, the methods do not differentiate between a recipient glancing at part(s) of the text and reading part(s) of the text. Additionally, the current methods do not consider the content of the message, such as the semantic weight of the text, in their determination of whether a message has been read. Thus, the triggered read receipt may not be an accurate representation of the recipient having read the core/important part(s) of the message. Thus, an implementation of updated and targeted criteria to trigger a determination that a message has been read is needed to improve the accuracy and reliability of the read receipt feature.

Thus, embodiments of the present invention may provide advantages including, but not limited to, contributing to a more effective and reliable communication process while using electronic messaging systems by mitigating miscommunication issues that may arise when the important parts of a message go unnoticed, or the message is only partially read. The program can leverage pupil dilation and gaze tracking to dynamically determine a message recipient's level of engagement while reading an electronic message. Additionally, the program can analyze an electronic message to rank the importance of the words and phrases in the message using natural language processing text analysis. The program can utilize the recipient's determined level of engagement and the word and phrase importance rankings to calculate/generate/determine several indexes, which ultimately, can be used to dynamically determine whether the recipient has sufficiently read the received message. Furthermore, the present embodiment can notify the sender that the message has been sufficiently read upon determining that the recipient has sufficiently read the message, as well as instruct the recipient to reread the message upon determining that the recipient has not sufficiently read the message. The present invention does not require that all advantages need to be incorporated into every embodiment of the invention.

The embodiments mentioned in this paragraph are further illustrated and described below in the discussions of FIGS. 1, 2, and 3. According to at least one embodiment, the program displays an electronic message to be read by a recipient on a device of the recipient. The program ranks the importance of one or more words and phrases in the electronic message. Also, the program performs gaze and pupil dilation tracking using one or more cameras and one or more sensors to produce a plurality of tracking data. Moreover, the program calculates a word engagement index using the plurality of tracking data and contents of the electronic message. Furthermore, the program combines the word engagement index and the importance rankings to generate a message reading index. Additionally, the program compares the message reading index to a predetermined threshold value to determine a reading confirmation index. Also, the program determines if the recipient has sufficiently read the electronic message based on the reading confirmation index.

According to at least one other embodiment, responsive to determining that the message reading index is greater than the predetermined threshold value based on the reading confirmation index, the program determines that the recipient has sufficiently read the electronic message. Responsive to the determining that the recipient has sufficiently read the electronic message, the program sends a read confirmation to a sender. According to at least one other embodiment, responsive to determining that the message reading index is less than or equal to the predetermined threshold value based on the reading confirmation index, the program determines that the recipient has not sufficiently read the electronic message. Responsive to the determining that the recipient has not sufficiently read the electronic message, the program sends a reread request to the recipient. According to at least one other embodiment, the ranking of the importance of the one or more words and phrases in the electronic message comprises using natural language processing text analysis. According to at least one other embodiment, the program dynamically determines the reading confirmation index as the recipient is reading the electronic message.

The present invention may be a system, a method, and/or a computer program product at any possible technical detail level of integration. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product to display an electronic message to be read by a recipient on a device of the recipient, rank an importance of one or more words and phrases in the electronic message, perform gaze and pupil dilation tracking using one or more cameras and one or more sensors to produce a plurality of tracking data, calculate a word engagement index using the plurality of tracking data and contents of the electronic message, combine the word engagement index and the importance rankings to generate a message reading index, compare the message reading index to a predetermined threshold value to determine a reading confirmation index, and determine if the recipient has sufficiently read the electronic message based on the reading confirmation index.

Figure 1:
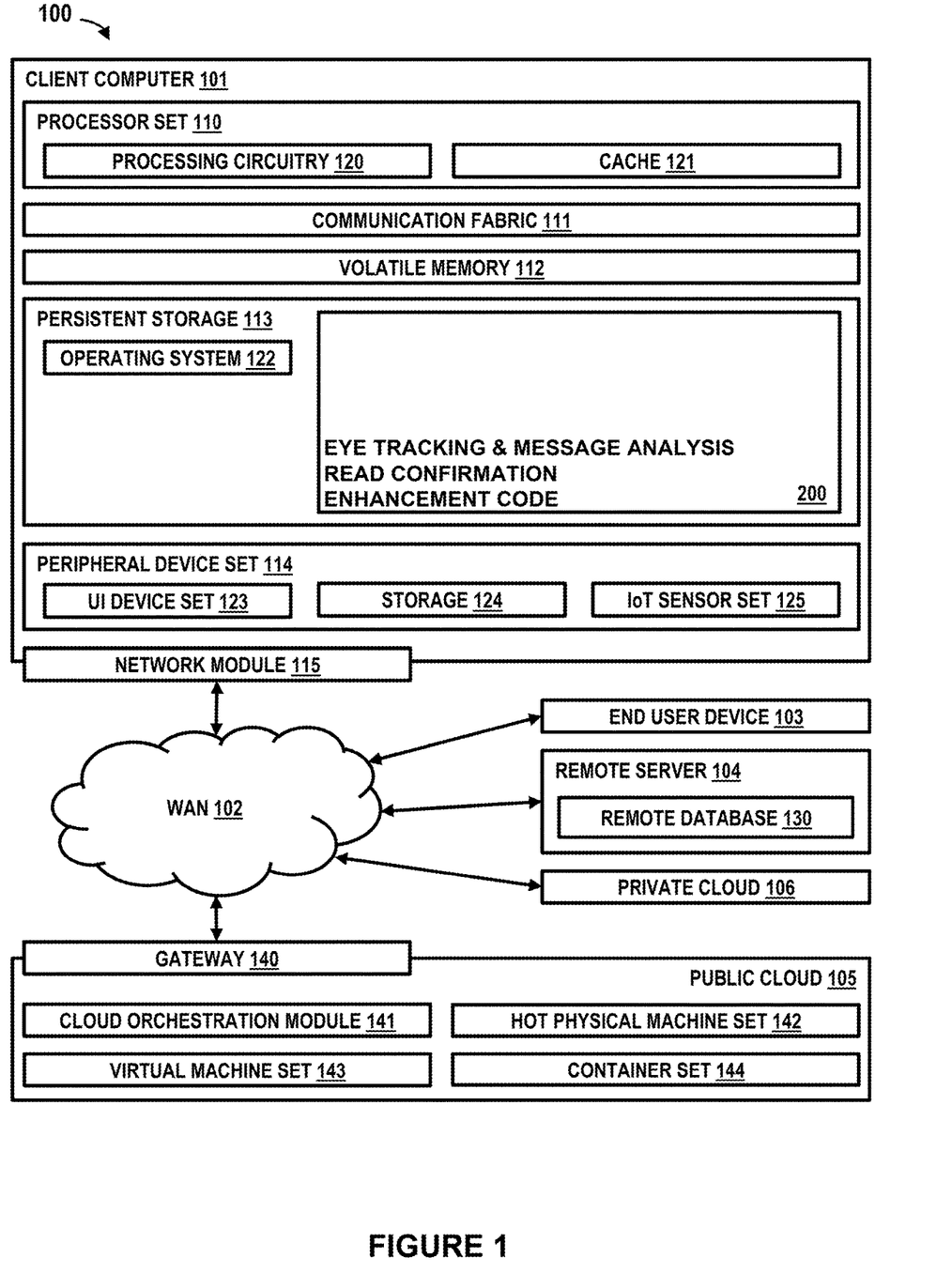
FIG. 1 illustrates an exemplary networked computer environment according to at least one embodiment.

Referring to FIG. 1, an exemplary networked computer environment 100 is depicted, according to at least one embodiment. Computing environment 100 contains an example of an environment for the execution of at least some of the computer code involved in performing the inventive methods, such as eye tracking and message analysis read confirmation enhancement code 200, also referred to as "eye tracking and message analysis read confirmation enhancement program" or "the program". In addition to code block 200 computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in code block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. In at least one embodiment, UI device set 123 may comprise one or more cameras used to accurately capture the pupil response of a recipient's eyes as they read a message, such as an infrared camera, pupilometer, eye-tracking camera, etc. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. In at least one embodiment, IoT sensor set 125 may comprise one or more sensors to accurately capture the movement and position of a recipient's eyes as they read a message, such as an opaque silicon-based image sensor.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The database 130 may be a digital repository capable of data storage and data retrieval. The database 130 can be present in the remote server 104 and/or any other location in the network 102. The database 130 can comprise machine learning models, as well as the training data used to train the machine learning models. Additionally, the database 130 can comprise gaze and pupil dilation tracking data. Also, the database 130 can comprise previously calculated/generated/determined WEI/MRI/RCI indexes, as well as word and phrase importance rankings. Additionally, the database 130 can store previously analyzed messages.

According to the present embodiment, the pupil dilation tracking and gaze utilization read confirmation enhancement program 200 may be a program capable of calculating a word engagement index of an electronic message using gaze and pupil dilation tracking data and contents of the electronic message, as well as combining the word engagement index and the word and phrase importance rankings of text in the electronic message to generate a message reading index. The program 200 may be a program capable of comparing the message reading index to a predetermined threshold value to determine if the electronic message recipient has sufficiently read the electronic message. Also, the program 200 may be a program capable of sending a notification to the recipient upon determining that the reading confirmation index is less than or equal to the predetermined threshold value. Additionally, the program 200 may be a program capable of sending a read confirmation to a sender upon determining that the reading confirmation index is greater than the predetermined threshold value. The program 200 may be located on client computing device 101 or remote server 104, or end user device 103, or on any other device located within network 102. Furthermore, the program 200 may be distributed in its operation over multiple devices, such as client computing device 101 and remote server 104. The eye tracking and message analysis read confirmation enhancement method is explained in further detail below with respect to FIG. 2.

Figure 2:
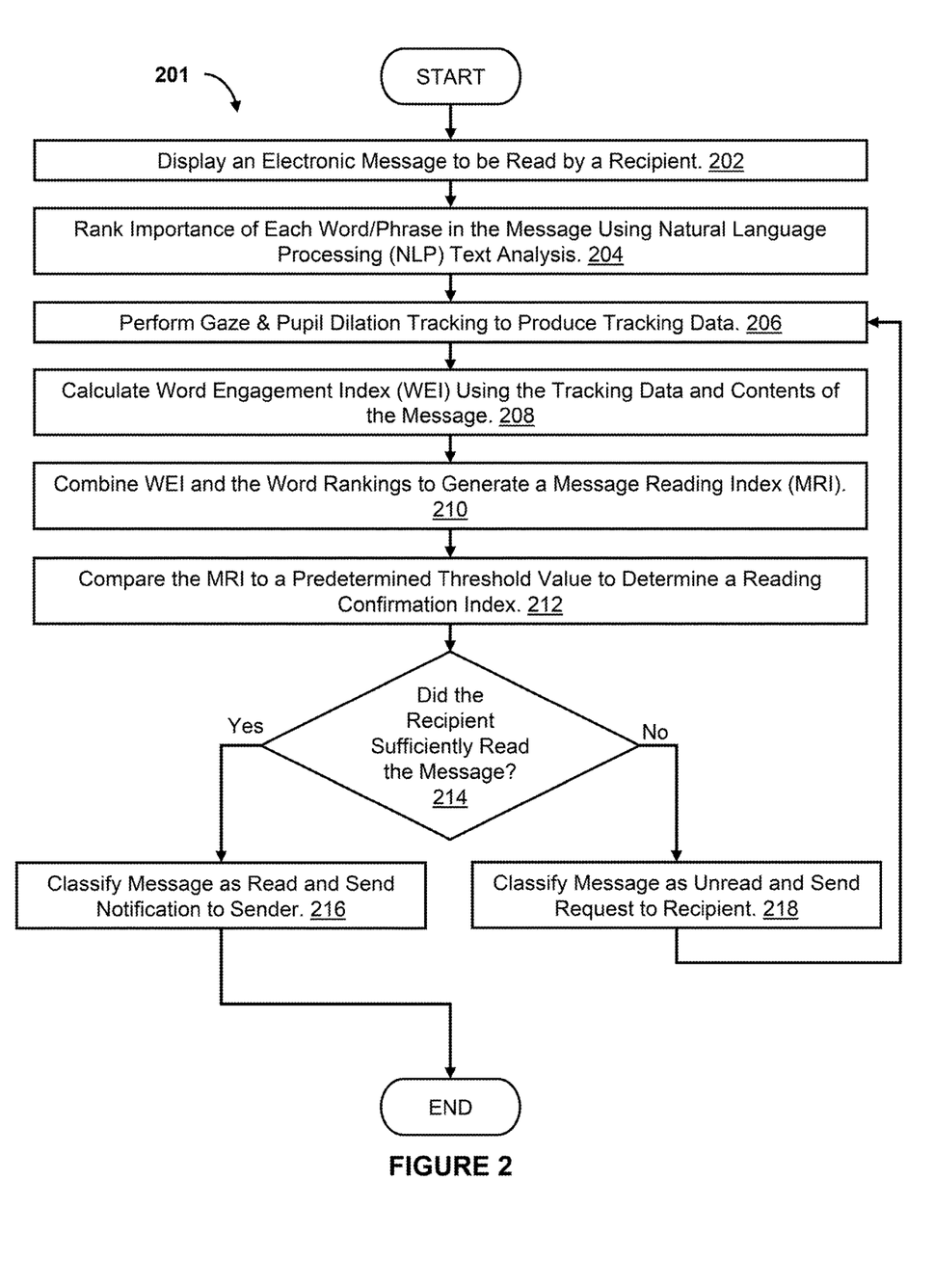
FIG. 2 is an operational flowchart illustrating an eye tracking and message analysis read confirmation enhancement process according to at least one embodiment.

Referring now to FIG. 2, an operational flowchart illustrating an eye tracking and message analysis read confirmation enhancement process 201 is depicted according to at least one embodiment. At 202, the program 200 displays an electronic message to be read by a recipient. An electronic message can comprise text, such as a text message, chat, instant message, conversation, email, etc. The electronic message can be internally stored in the database 130, generated within the device 103, or received externally to the device, such as through WAN 102. The program 200 can display an electronic message on the display of the device 103 upon receiving a selection of the message by the recipient. For example, a recipient may click a conversation on the recipient's graphical user interface (GUI) on the device 103.

At 204, the program 200 ranks the importance of each word/phrase in the electronic message using natural language processing text analysis. Upon displaying the electronic message on the display of the recipient's device 103, the program 200 can rank the words/phrases in the message by their importance, i.e., semantic weight, using a natural language processing (NLP) word ranking module 304 (FIG. 3). The program 200 can input the electronic message into the NLP word ranking module 304. The NLP word ranking module 304 may comprise an existing pre-trained word-frequency distribution model or a keyword phase extraction model, such as Key Bidirectional Encoder Representations from Transformers (KeyBERT).

The NLP word ranking module 304 can parse the text in the electronic message, extract the words/phrases in the electronic message, and evaluate the importance of each word/phrase in the electronic message based on their determined relevance/context in comparison to the essence of the electronic message as a whole. For example, NLP word ranking module 304 may extract words/phrases from the electronic message and can compute vectors that represent the meaning of both the extracted words/phrases from the electronic message and the overall electronic message. Additionally, NLP word ranking module 304 may compare the vectors produced for the words/phrases to the vector produced for the entire electronic message, such as by using the cosine similarity between the vectors as the metric to determine the distance between them. The NLP word ranking module 304 may assign importance scores to the words/phrases based on their distance to the vector for the entire electronic message. The highest importance scores can represent the closest vectors to the vector for the entire electronic message. Importance score values may comprise values of zero through ten [0-10]. For example, an electronic message may include "She wants to buy a car, but she is unable to afford one." The NLP word ranking module 304 may analyze the electronic message and output respective importance score values of [7, 6, 2, 9, 3, 8, 7, 5, 1, 10, 3, 9, 5].

The NLP word ranking module 304 may determine the content/composition of the electronic message by extracting the features associated/derived with/from the received electronic message. Features in an electronic message can be the components of an electronic message that are not the main body of the text. Features in an electronic message include the number of words/lines in the electronic message, the average amount of time a person is expected to take to read a line of the electronic message, the estimated amount of time a person is expected to take to read the entire electronic message, the word/phrase placement in the electronic message, etc.

At 206, the program 200 performs gaze and pupil dilation tracking using the one or more cameras 123 and the one or more sensors 125 to produce a plurality of tracking data. The program 200 can monitor and record the direction of a recipient's gaze and changes in pupil size of the recipient's eyes while the recipient is reading the displayed electronic message. Gaze tracking includes the detection and measurement of a person's eye movements and point of gaze. Pupil dilation includes the expansion and narrowing of the pupil's size. Additionally, the program 200 can track eye fixations, for example, sustained periods of gaze, and saccades, for example, rapid eye movements between fixations.

Upon displaying the electronic message on the display of the recipient's device 103, the program 200 can detect and track the movements of the recipient's eyes while viewing the electronic message using the one or more cameras 123 and the one or more sensors 125. The cameras 123 and the sensors 125 can capture a plurality of images, wherein each image may represent the positions of the recipient's eyes during the duration of reading the message. The cameras 123 and sensors 125 may capture the images at a rate rapid enough to capture all changes in the positions of the eyes. The program 200 can receive the captured images and can convert each of the captured images into coordinates within a Cartesian coordinate system, such that the coordinate represents the detected position of the eyes. The program 200 may generate each coordinate by computing a relative change in the position of the eyes corresponding to consecutive images. The program 200 can compare coordinates to determine the movements of the recipient's eyes while reading the message.

Additionally, the cameras 123 and the sensors 125 can capture a plurality of images of the recipient's eyes during the duration of reading the electronic message. The cameras 123 and sensors 125 may capture the images at a rate rapid enough to capture all changes in the pupil responses of the recipient's eyes. The program 200 can receive the captured depictions of the eyes and can determine the sizes of the pupils in the depictions using color-different detecting techniques. The program 200 can compare the sizes of the pupils in each depiction to a captured reference pupil size of the recipient to determine the pupil responses of the eyes of the recipient while reading the message.

Figure 3:
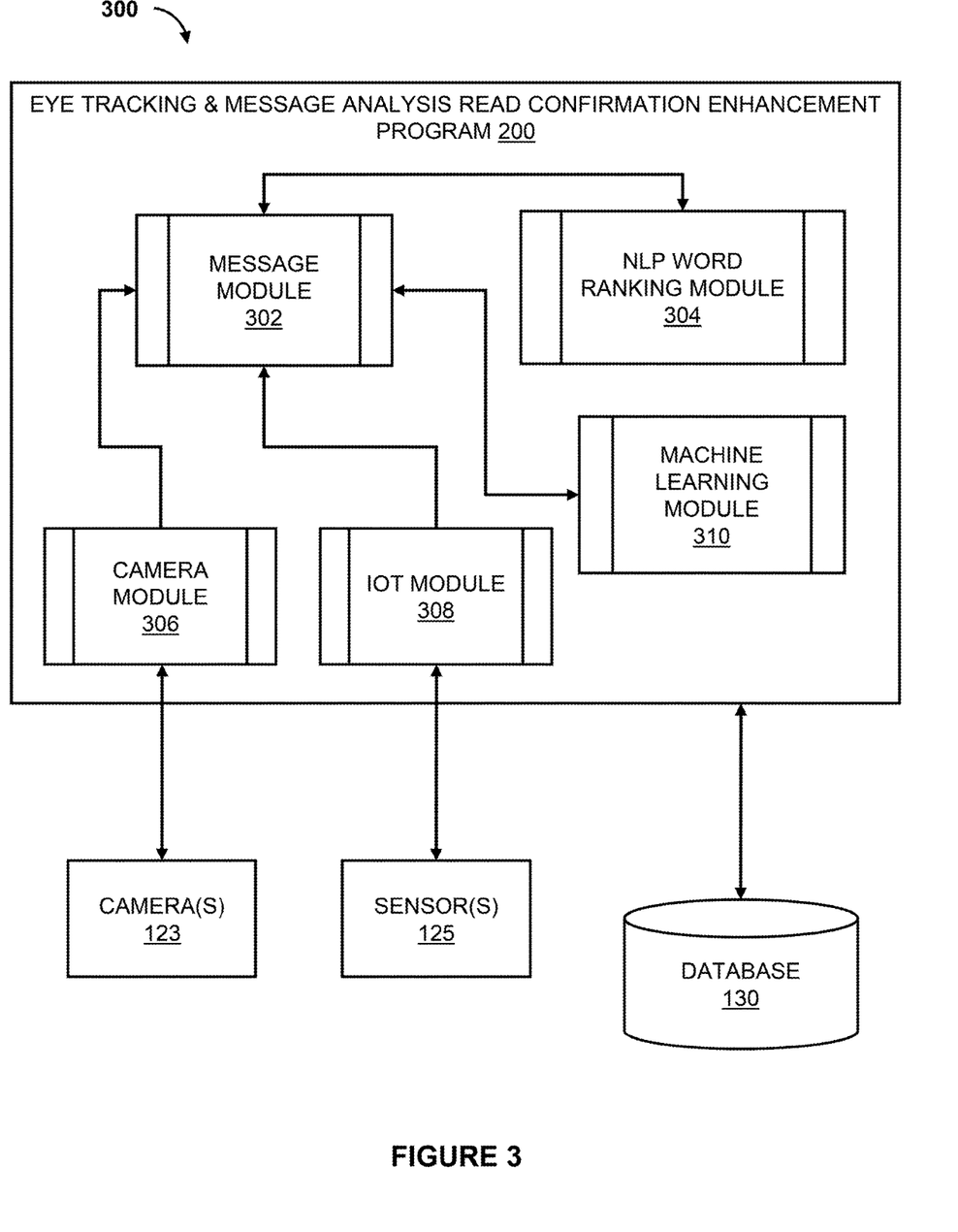
FIG. 3 is a system diagram illustrating an exemplary program environment of an implementation of an eye tracking and message analysis read confirmation enhancement process according to at least one embodiment.

The program 200 may perform data pre-processing, consisting of environment-independent processing, of the captured images and depictions from the cameras 123 and sensors 125, and the labeling of relative pupil size (RPS) sequences, using the camera module 306 (FIG. 3) and the IoT module 308 (FIG. 3). The camera module 306 and the IoT module 308 may be integrated into the device 103, computer 101, or in the remote server 104. The camera module 306 may be used to communicate with the one or more cameras 123. The IoT module 308 may be used to communicate with the one or more sensors 125. The labeling of RPS sequences may comprise evaluating and plotting the RPS sequences during the reading of the electronic message to identify and eliminate outliers in the images and depictions.

Additionally, the program 200 can employ a data scaling technique, such as normalization, to standardize the values of the features in the gaze fixation durations and the pupil dilation datasets, by shifting and rescaling them to bring the values to a common scale between zero (0) and ten (10). The formula for normalization can be:

$$X' = \frac{X - X_{min}}{X_{max} - X_{min}}$$

The maximum value of the feature in the dataset can be represented by $X_{max}$. The minimum value of the feature in the dataset can be represented by $X_{min}$. When the value of X is the minimum value in the dataset, the numerator will be zero (0), and thus, X' can be zero (0). When the value of X is the maximum value in the dataset, the numerator can be ten (10), and thus, X' can be ten (10). If the value of X is between the minimum and maximum value in the dataset, the value of X' can be between zero (0) and ten (10). For example, gaze fixation durations of [100 ms, 120 s, 80 ms, 150 ms, 90 ms, 110 ms, 130 ms, 140 ms, 70 ms, and 100 ms] may be normalized to values of [4, 6, 2, 8, 3, 5, 7, 8, 1, 4]. Also, for example, pupil dilation values of [0.5 mm, 0.6 mm, 0.4 mm, 0.7 mm, 0.5 mm, 0.6 mm, 0.8 mm, 0.7 mm, 0.3 mm, 0.5 mm] may be normalized to values of [6, 7, 5, 8, 6, 7, 10, 8, 4, 6].

At 208, the program 200 calculates a word engagement index (WEI) using the plurality of tracking data and contents of the electronic message. The word engagement index can be a quantifiable metric that measures the recipient's attentiveness, cognitive involvement, and responsiveness to each word/phrase in the electronic message. The WEI can be derived from monitoring a recipient's level of engagement and the parts of the text the recipient primarily focused on while reading the electronic message. A recipient's level of engagement and the parts of the text the recipient primarily focused on while reading the electronic message can be represented by the analyzed gaze and pupil dilation tracking data. The program 200 can calculate the WEI by inputting the collected gaze and pupil dilation tracking data, as well as the electronic message, into a deep learning model, such as a convolutional neural network (CNN). The deep learning model can analyze the tracking data alongside the text of the electronic message. The deep learning model may comprise a combination of natural language processing techniques and machine learning algorithms. The deep learning model may analyze the tracking data alongside the electronic message to determine a word-read confirmation value for each word/phrase based on the analyzed tracking data. A word-read confirmation can represent whether the reader has read a word/phrase in the electronic message. For example, a word-read confirmation value may be a value of one (1) if the model determines that the recipient has read the word/phrase, and a value of zero (0) if the model determines that the recipient has not read the word/phrase. A simplified representation of the deep learning model formula for calculating the WEI can be:

$$WEI = a*(\text{Word} - \text{Read Confirmation}) +$$
$$b*(\text{Gaze Fixation Values}) + c*(\text{Pupil Dilation Values})$$

The deep learning model may represent the weights calculated by the model during its training as a, b, and c. The deep learning model may output a WEI value, such as 7.8. For example, a message may include "She wants to buy a car, but she is unable to afford one." The gaze fixation durations may respectively comprise values of [100 ms, 120 s, 80 ms, 150 ms, 90 ms, 110 ms, 130 ms, 140 ms, 70 ms, 100 ms, 90 ms, 160 s, 120 ms], which may be normalized to values of [4, 6, 2, 8, 3, 5, 7, 8, 1, 4, 3, 9, 6]. The pupil dilation values may respectively comprise values of [0.5 mm, 0.6 mm, 0.4 mm, 0.7 mm, 0.5 mm, 0.6 mm, 0.8 mm, 0.7 mm, 0.3 mm, 0.5 mm, 0.3 mm, 0.8 mm, 0.6 mm], which may be normalized to values of [6, 7, 5, 8, 6, 7, 10, 8, 4, 6, 4, 10, 7]. The deep learning model may respectively determine word-read confirmation values of [1, 0, 0, 1, 1, 0, 1, 0, 1, 0, 0, 1, 1] based on the analysis of the tracking data. Thus, the deep learning model can calculate a WEI of 8.1 by respectively weighing the gaze fixation duration values, pupil dilation values, and word read confirmation values, and summing the weighted values together.

The program 200 may train the deep learning model for gaze tracking by directing a recipient to look at specific points on the recipient's EUD 103 and/or in the recipient's surrounding environment to establish a reference for accurate gaze tracking. Also, the program 200 may train the deep learning model for pupil dilation tracking by directing a recipient to read various types of content on their EUD 103, such as emotional content or content designed to induce specific cognitive loads, and read under different lighting conditions, to establish a baseline pupil diameter level for the recipient. Additionally, the deep learning model may be trained with a diverse dataset of text along with corresponding engagement scores.

At 210, the program 200 combines the WEI and the word/phrase importance rankings to generate a message reading index (MRI). The message reading index can be a composite metric that measures the overall engagement level of the recipient while reading the entirety of the received electronic message (i.e. the MRI represents the percentage of important content that has been read in the message/the likelihood that the recipient has sufficiently read the received electronic message). The program 200 can generate the MRI using a trained machine learning module 310 (FIG. 3), comprising various algorithms, such as classification and regression algorithms. Specifically, the trained machine learning module 310 can generate the MRI by overlaying and merging the WEI with the importance scores of the words/phrases in the electronic message. A simplified representation of the trained machine learning module 310 formula for calculating the MRI can be:

$$MRI = x*(WEI) + y*(\text{importance rankings})$$

The machine learning module 310 may represent the weights, calculated by the machine learning module 310 during the training phase, as x and y. The machine learning module 310 can output the MRI value, for example, a value such as one hundred fifty (150) or four hundred (400). For example, the machine learning module 310 can calculate an MRI value of 343.356 by respectively weighing the WEI value and the importance rankings, and summing the weighted values together. The program 200 can train the machine learning module 310 using a supervised machine learning technique, with example inputs, such as a WEI value of 7.8 and word/phrase importance rankings of [7, 5, 3, 8, 2, 9, 4, 6, 10, 10, 3], with their features, as well as their corresponding desired outputs.

At 212, the program 200 compares the generated MRI to a predetermined threshold value to determine a reading confirmation index (RCI). The RCI can be a decisive measure, for example, "read" or "unread", that confirms the recipient's engagement with the electronic message based on the combined assessment of the recipient's responsiveness (i.e. the generated MRI). The predetermined threshold value may be a dynamic value based on the content/composition of an electronic message. The program 200 can calculate a predetermined threshold value by setting the predetermined threshold value to be equal to an MRI value that would represent that the recipient read at least a certain percentage of the words/phrases in a received electronic message. For example, the program 200 may calculate the dynamic threshold value by removing stop words (i.e. words determined to be insignificant) from the received electronic message. Furthermore, the program 200 may calculate the threshold value by setting the threshold value to be equal to an MRI value that constitutes the recipient sufficiently reading at least fifty (50%) of the remaining words in the electronic message, such as a value of 280.569. In the previous example, the remaining words in the electronic message can be the words in the electronic message minus the stop words in the received electronic message. The program 200 may determine a "read" RCI if the MRI is greater than or equal to the predetermined threshold value. Conversely, the program 200 may determine an "unread" RCI if the MRI is less than the predetermined threshold value. For example, the program 200 may determine a "read" RCI value by comparing a calculated MRI value of 343.356 to the predetermined threshold value of 280.569, and computing that the calculated MRI value is greater than the predetermined threshold value.

At 214, the program 200 dynamically determines if the recipient has sufficiently read the electronic message based upon the comparison of the MRI to the predetermined threshold value. According to one implementation, if the program 200 determines that the recipient has sufficiently read the electronic message (step 214, "YES" branch), the program 200 may continue to step 216 to classify the electronic message as "read" and can send a read confirmation notification to the sender. Upon the determined reading confirmation index indicating that the message reading index is greater than the predetermined threshold value (i.e. a read RCI), the program 200 can determine that the recipient has sufficiently read the electronic message. If the program 200 determines that the recipient has not sufficiently read the electronic message (step 214, "NO" branch), the program 200 may continue to step 218 to classify the electronic message as "unread" and can send a reread notification to the recipient. Upon the determined reading confirmation index indicating that the message reading index is less than or equal to the predetermined threshold value (i.e. an unread RCI), the program 200 can determine that the recipient has not sufficiently read the electronic message At 216, the program 200 classifies the electronic message as "unread" and sends a reread notification to the recipient. The reread notification may be a push notification, appearing on the GUI of the recipient's EUD device 103, that informs the recipient that the electronic message has not been sufficiently read, and requests that the recipient reread the electronic message. The program 200 can send a notification to the recipient using the message regenerator submodule 302 (FIG. 3). The message regenerator submodule 302 may be used to generate new electronic messages and notifications, as well as send the electronic messages and the notifications.

At 218, the program 200 classifies the electronic message as "read" and sends a read confirmation notification to the sender. The read confirmation notification may be a push notification, appearing on the sender's GUI of their EUD 103, that informs the sender that the recipient has sufficiently read the sent electronic message. The program 200 can send a notification to the sender using the message regenerator submodule 302.

Referring now to FIG. 3, a system diagram illustrating an exemplary program environment 300 of an implementation of an eye tracking and message analysis read confirmation enhancement process 201 is depicted according to at least one embodiment. Here, the program 200 comprises a message regenerator submodule 302, an NLP word ranking module 304, a camera module 306, an IoT module 308, and a machine learning module 310. The exemplary program environment 300 details the passages of data between the message regenerator submodule 302 and the NLP word ranking module 304, the message regenerator submodule 302 and the camera module 306, the message regenerator submodule 302 and the IoT module 308, and the message regenerator submodule 302 and the machine learning module 310. Additionally, the exemplary program environment 300 details the passage of data between the camera module 306 and the camera(s) 123, the IoT module 308 and the sensor(s) 125, and the program 200 and the database 130.

It may be appreciated that FIGS. 2 through 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for electronic message engagement assessment, the method comprising:

displaying an electronic message to be read by a recipient on a device of the recipient;

ranking an importance of one or more words and phrases in the electronic message;

performing gaze and pupil dilation tracking using one or more cameras and one or more sensors to produce a plurality of tracking data;

calculating a word engagement index using the plurality of tracking data and contents of the electronic message;

combining the word engagement index and the importance rankings to generate a message reading index;

comparing the message reading index to a predetermined threshold value to determine a reading confirmation index;

determining if the recipient has sufficiently read the electronic message based on the reading confirmation index; and responsive to the determining that the recipient has not sufficiently read the electronic message, sending a reread request to the recipient.

2. The method of claim 1, the method further comprising:
responsive to determining that the message reading index is greater than the predetermined threshold value based on the reading confirmation index, determining that the recipient has sufficiently read the electronic message.

3. The method of claim 2, the method further comprising:
responsive to the determining that the recipient has sufficiently read the electronic message, sending a read confirmation to a sender.

4. The method of claim 1, the method further comprising:
responsive to determining that the message reading index is less than or equal to the predetermined threshold value based on the reading confirmation index, determining that the recipient has not sufficiently read the electronic message.

5. The method of claim 1, wherein the ranking of the importance of the one or more words and phrases in the electronic message comprises using natural language processing text analysis.

6. The method of claim 1, wherein the reading confirmation index is determined as the recipient is reading the electronic message.

7. A computer system for electronic message engagement assessment, the computer system comprising:
one or more processors, one or more computer-readable memories, one or more computer-readable tangible storage mediums, and program instructions stored on at least one of the one or more tangible storage medium for execution by at least one of the one or more processors via at least one of the one or more memories, wherein the computer system is capable of performing a method comprising:
displaying an electronic message to be read by a recipient on a device of the recipient;
ranking an importance of one or more words and phrases in the electronic message;
performing gaze and pupil dilation tracking using one or more cameras and one or more sensors to produce a plurality of tracking data;
calculating a word engagement index using the plurality of tracking data and contents of the electronic message;
combining the word engagement index and the importance rankings to generate a message reading index;
comparing the message reading index to a predetermined threshold value to determine a reading confirmation index;
determining if the recipient has sufficiently read the electronic message based on the reading confirmation index; and
responsive to the determining that the recipient has not sufficiently read the electronic message, sending a reread request to the recipient.

8. The computer system of claim 7, the method further comprising:
responsive to determining that the message reading index is greater than the predetermined threshold value based on the reading confirmation index, determining that the recipient has sufficiently read the electronic message.

9. The computer system of claim 8, the method further comprising:
responsive to the determining that the recipient has sufficiently read the electronic message, sending a read confirmation to a sender.

10. The computer system of claim 7, the method further comprising:
responsive to determining that the message reading index is less than or equal to the predetermined threshold value based on the reading confirmation index, determining that the recipient has not sufficiently read the electronic message.

11. The computer system of claim 7, wherein the ranking of the importance of the one or more words and phrases in the electronic message comprises using natural language processing text analysis.

12. The computer system of claim 7, wherein the reading confirmation index is determined as the recipient is reading the electronic message.

13. A computer program product for electronic message engagement assessment, the computer program product comprising:
one or more computer-readable tangible storage mediums and program instructions stored on at least one of the one or more tangible storage medium, the program instructions executable by a processor to cause the processor to perform a method comprising:
displaying an electronic message to be read by a recipient on a device of the recipient;
ranking an importance of one or more words and phrases in the electronic message;
performing gaze and pupil dilation tracking using one or more cameras and one or more sensors to produce a plurality of tracking data;
calculating a word engagement index using the plurality of tracking data and contents of the electronic message;
combining the word engagement index and the importance rankings to generate a message reading index;
comparing the message reading index to a predetermined threshold value to determine a reading confirmation index;
determining if the recipient has sufficiently read the electronic message based on the reading confirmation index and
responsive to the determining that the recipient has not sufficiently read the electronic message, sending a reread request to the recipient.

14. The computer program product of claim 13, the method further comprising:
responsive to determining that the message reading index is greater than the predetermined threshold value based on the reading confirmation index, determining that the recipient has sufficiently read the electronic message.

15. The computer program product of claim 14, the method further comprising:
responsive to the determining that the recipient has sufficiently read the electronic message, sending a read confirmation to a sender.

16. The computer program product of claim 13, the method further comprising:
responsive to determining that the message reading index is less than or equal to the predetermined threshold value based on the reading confirmation index, determining that the recipient has not sufficiently read the electronic message.

17. The computer program product of claim 13, wherein the ranking of the importance of the one or more words and phrases in the electronic message comprises using natural language processing text analysis.

* * * * *